G. STEVENSON.
Corn-Knives.
No. 138,447.  Patented April 29, 1873.
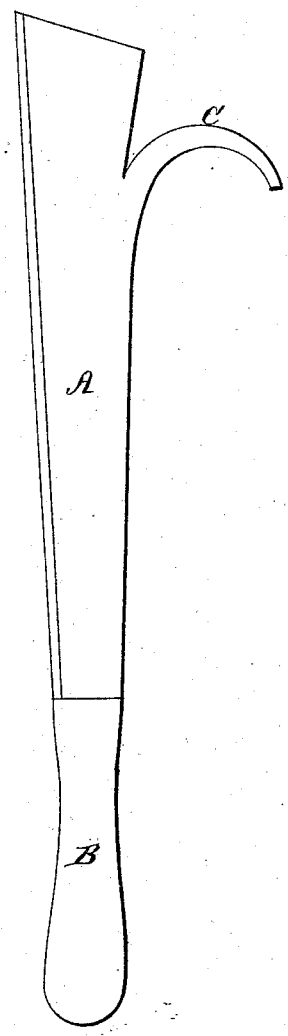
Witnesses  Inventor
John A. Ellis  George Stevenson
Wm. H. Ellis  Per
 C. H. Watson & Co.
 Attys

UNITED STATES PATENT OFFICE.

GEORGE STEVENSON, OF ZIONSVILLE, INDIANA.

IMPROVEMENT IN CORN-KNIVES.

Specification forming part of Letters Patent No. 138,447, dated April 29, 1873; application filed March 8, 1873.

*To all whom it may concern:*

Be it known that I, GEORGE STEVENSON, of Zionsville, in the county of Boone and State of Indiana, have invented certain new and useful Improvements in Corn-Knife; and I do hereby declare that the following is a full, clear, and exact description thereof, that will enable others skilled in the art to which it appertains to make and use the same, reference being had to the accompanying drawing and to the letters of reference marked thereon which form a part of this specification.

My invention relates to knives used in cutting corn and corn-stalks; and it consists in a curved hook formed on or attached to the back of the knife a suitable distance from the point, with which the operator is enabled to raise the fallen or tangled stalks, and also gather the scattered stalks so as to be taken in at a single gripe.

The accompanying drawing is a side view of my improved corn-knife.

A represents the blade, and B the handle, of a corn-knife or a knife for cutting corn and corn-stalks, made of any suitable dimensions and in any of the known and usual forms. On the back of the blade A, at a suitable distance from the point, is formed or attached a curved hook, C, which may be of any desired size, and of such strength as to enable the operator to raise and gather the fallen and tangled stalks, and bring them up to his hand to be held while being cut.

The hook being near the outer end or point of the knife, the operator is enabled to do his work without stooping, and therefore can perform considerable more work per day. Where the stalks stand straight the hook is of equal advantage in bringing into the hand all the stalks which are too much scattered-to be taken in at a single gripe.

Having thus fully described my invention, what I claim as new, and desire to secure by Letters Patent, is—

A corn-knife having a curved hook, C, formed on or attached to the back of the blade near the outer end, substantially as and for the purposes herein set forth.

In testimony that I claim the foregoing I have hereunto set my hand this 21st day of February, 1873.

GEORGE STEVENSON.

Witnesses:
 WILLIAM H. DOOLY,
 S. S. DAVIS.